Figure 1:
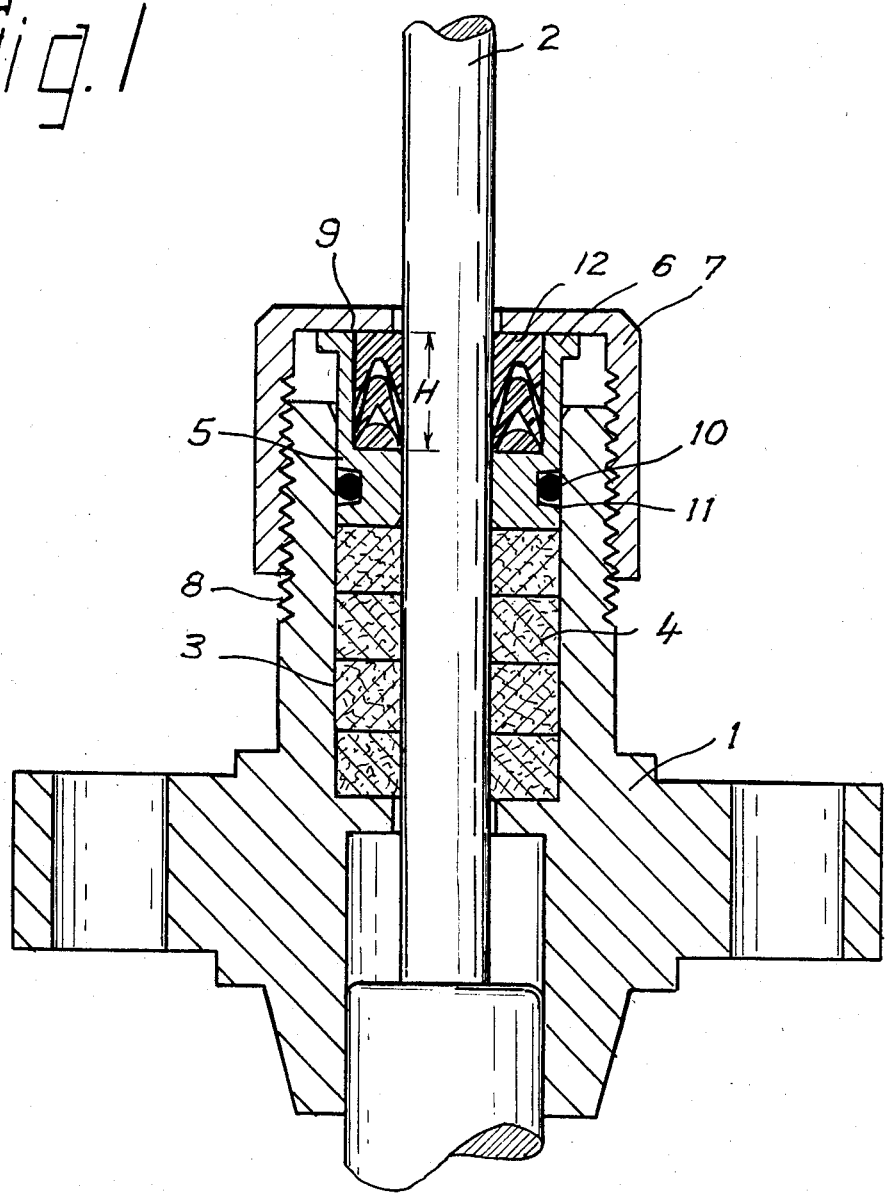

United States Patent [19]

Baumann

[11] Patent Number: 4,577,873
[45] Date of Patent: Mar. 25, 1986

[54] DUAL VALVE STEM PACKING ARRANGEMENT

[76] Inventor: Hans D. Baumann, 32 Pine St., Rye, N.H. 03870

[21] Appl. No.: 717,834

[22] Filed: Mar. 29, 1985

[51] Int. Cl.$^4$ ............................................. F16J 15/24
[52] U.S. Cl. ................................. 277/110; 277/123
[58] Field of Search .............. 277/102, 110, 111, 123, 277/205

[56] References Cited

U.S. PATENT DOCUMENTS

| | | | |
|---|---|---|---|
| 1,798,158 | 3/1931 | Hazard | 277/110 |
| 3,281,155 | 10/1966 | Kauffman | 277/110 |
| 3,442,518 | 5/1969 | Henshaw | 277/110 |
| 3,957,295 | 5/1976 | Gould | 277/110 |
| 4,330,135 | 5/1982 | Butterfield | 277/102 |
| 4,529,181 | 7/1985 | Wallis | 277/110 |

Primary Examiner—Robert I. Smith

[57] ABSTRACT

Valve packing comprising one lower, adjustable, compressible, solid ring set followed by an upper, non-adjustable, pre-compressed, flexible, plastic v-ring set; both packing sets inter-spaced by a slidable gland having an additional outer elastomeric seal, said gland being able to compress said solid ring set without changing the geometry of the v-ring set.

3 Claims, 1 Drawing Figure

DUAL VALVE STEM PACKING ARRANGEMENT

BACKGROUND OF THE INVENTION

With increased environmental restrictions placed on valves, valve stem packing has been identified as a major source of pollution in process plants and the like.

While manually controlled valves pose a lesser problem because (a). the packing can be compressed tighter without concern for excessive stem friction and (b). they are operated less frequently, automatic modulating control valves have more servere problems. An overtightening of a reciprocating type stem packing will cause immediate and excessive operator hysteresis. The wear of such a packing is also more pronounced because modulating or throttling control valves may operate continuously.

One common solution to this problem has been to employ metallic bellows seals around the reciprocating valve stems. This solution is very costly and in addition, such bellows are subject to pressure limitations and fatigue life restraints.

Pre-adjusted or pressure assisted packing, consisting typically of spring loaded chevron or v-rings made from TFE resins, offer better seals with less friction than conventional woven, solid rings made from asbestos, TFE-yarn or graphite. However, they are subject to wear, particularly when the valve stem is subject to internal or external corrosion or adherence by solid particles.

My invention overcomes these and other problems by providing a combination of packings in one single assembly. While the lower portion of my dual packing system retains the more rugged and adjustable conventional woven solid packing rings which are less subject to wear and which may be re-tightened in service, the upper portion of my invention will consist of pressure assisted v-rings made from solid TFE, for example. The packing follower separating the two sets is slidingly arranged to enable compression of the lower rings without compressing the upper rings. An additional o-ring seal will prevent leakage to pass the exterior of the packing follower.

A user is now able to compress the lower packing at will without putting excessive pressure on the upper v-ring packing (which would cause blockage of the valve stem). It also permits to add a skive-cut woven packing ring for emergency repairs without disassembling the valve, by simply lifting the follower out of the packing box area. While the lower woven packing will wipe and clean the valve stem from any foreign matter, the upper v-ring packing will serve as a back-up and prevent leakage of any fluid that may pass the first or primary packing.

DESCRIPTION OF THE INVENTION

Refering now to the Drawing, FIG. 1, in which a preferred embodiment of the invention is illustrated; here a valve bonnet 1 contains a centrally located valve stem 2 which is attached to a reciprocating valve actuator of conventional design (not shown). A cylindrical chamber 3 placed at the top portion of bonnet 1 contains near the bottom a number of skive-cut pre-compressed packing rings 4 made from commercially available materials such as woven asbestos, TFE-yarn or graphite filaments.

Packing rings 4 are adjustably compressed by a follower 5 whose upper terminating shoulder 6 is compressed by a packing nut 7 which treadingly engages the upper portion of bonnet 1. Packing follower 6 has an upper recessed bore 9 snuggly retaining within a set of chevron or v-rings 12 typically molded from solid TFE resin.

The compressed height H of such a set of v-rings is very critical. If the height H is too small then the resulting compression of the v-rings will lead to a blocking of the valve stem motion. If depth H is too much then there will be insufficient sealing of the stem.

My invention solves this problem in that dimension H is maintained constantly at its pre-selected optimum by having packing nut 7 be in limiting compression against shoulder 6 regardless of the longitudinal position of gland 5 within chamber bore 3. A conventional o-ring seal 10 may be placed within a suitable grove 11 to seal the exterior of gland 5. While such o-ring seals are not suitable for sealing against reciprocating valve stems due to high friction and other limitations, such o-ring seal serves a useful function in this instance, since it acts essentially as a static seal.

After possible wear of the lower primary packing 4, one or more woven packing rings may be inserted around stem 2 after packing nut 7 has been unscrewed and packing follower 5 together with the solid v-rings are pulled out of chamber 3. This can be done without disturbing the upper v-ring packing set 12 or change in their pre-determined compressed height H or, without dis-assembly of the complete valve i.e. removal of valve stem 2.

Numerous changes may be made without departing from the spirit of my attached claims. For example, while the description is centered around a reciprocating valve stem, the arrangement will work equally as well for rotary valve stems such as found in Butterfly valves. It would also be obvious to replace the threaded packing nut 7 by a bolted packing flange without impairing the intended functions or claims of my invention.

I claim:

1. Dual packing arrangement comprising a valve stem sealingly engaging one lower set of packing rngs and one upper set of packing rings, a slidingly arranged packing follower engaging and capable of compressing said lower packing ring set, said packing follower having a cylindrical recess of pre-determined depth to house the upper set of packing rings, a valve bonnet having a recessed chamber snuggly containing within said set of lower packing rings and allowing for sliding engagement of said packing follower, additional means to motivate said packing follower against said set of lower packing rings having a shouldered portion overlapping and closing the cylindrical recess in said packing follower.

2. Dual packing arrangement as described in claim 1, wherein said packing follower has a recessed groove around its exterior circumference containing within at least one o-ring seal.

3. Dual packing arrangement as described in claim 1, wherein said lower packing consists of skive-cut solidly formed rings made from TFE of graphite-yarns and where said upper packing consists of flexible Chevron or v-rings.

* * * * *